US011459088B2

(12) United States Patent
Thompson et al.

(10) Patent No.: US 11,459,088 B2
(45) Date of Patent: Oct. 4, 2022

(54) ROTOR ASSEMBLY

(71) Applicant: Bell Textron Inc., Fort Worth, TX (US)

(72) Inventors: George Matthew Thompson, Lewisville, TX (US); Charles Hubert Speller, Flower Mound, TX (US); Jonathan Knoll, Burleson, TX (US)

(73) Assignee: Textron Innovations Inc., Providence, RI (US)

( * ) Notice: Subject to any disclaimer, the term of this patent is extended or adjusted under 35 U.S.C. 154(b) by 433 days.

(21) Appl. No.: 16/590,322

(22) Filed: Oct. 1, 2019

(65) Prior Publication Data

US 2021/0094674 A1     Apr. 1, 2021

(51) Int. Cl.
| | |
|---|---|
| B64C 11/46 | (2006.01) |
| B64C 11/10 | (2006.01) |
| B64C 11/00 | (2006.01) |
| B64C 29/00 | (2006.01) |
| B64D 27/24 | (2006.01) |

(52) U.S. Cl.
CPC ............ *B64C 11/10* (2013.01); *B64C 11/001* (2013.01); *B64C 11/46* (2013.01); *B64C 29/0033* (2013.01); *B64D 27/24* (2013.01); *F16C 2326/43* (2013.01)

(58) Field of Classification Search
None
See application file for complete search history.

(56) References Cited

U.S. PATENT DOCUMENTS

| | | | | |
|---|---|---|---|---|
| 5,693,896 | A * | 12/1997 | Mistral | G01L 5/133 |
| | | | | 73/178 H |
| 6,062,818 | A * | 5/2000 | Manfredotti | B64C 27/001 |
| | | | | 416/145 |
| 11,104,414 | B2 * | 8/2021 | Thompson | B64C 27/32 |
| 2003/0222171 | A1 | 12/2003 | Zoppitelli et al. | |
| 2021/0139157 | A1 * | 5/2021 | Thompson | B64C 11/001 |

FOREIGN PATENT DOCUMENTS

| | | |
|---|---|---|
| DE | 1456089 A1 | 6/1969 |
| DE | 10201220318 A1 | 9/2013 |
| WO | 2019066484 A1 | 4/2019 |

OTHER PUBLICATIONS

European Search Report in related European Patent Application No. 20190768.0 dated Feb. 5, 2021, 4 pages.
European Exam Report in related European Patent Application No. 20190768.0 dated Feb. 17, 2021, 6 pages.

* cited by examiner

*Primary Examiner* — Michael Lebentritt
(74) *Attorney, Agent, or Firm* — Lightfoot & Alford PLLC

(57) ABSTRACT

A rotor assembly configured to increase the stiffness of a rotor mast. The rotor assembly includes the rotor mast, a rotor hub, a mast nut, a mast bearing, and a cuff disposed between the mast nut and the mast bearing. The cuff is captured and compressed between the mast nut and the inner race of the mast bearing along an uninterrupted load path that extends between the mast nut and the mast bearing.

20 Claims, 6 Drawing Sheets

ROTOR ASSEMBLY

BACKGROUND

Placing a fan inside a duct can result in a system that produces more thrust for the same power. This increase in thrust is produced because the shape of the duct allows the duct to carry a thrust force. In order to maximize efficiency, ducts typically place the fan in a generally cylindrical section of the duct and include a generally quarter toroidal inlet upstream of the fan and a generally frusto-conical diffuser section downstream of the fan. This arrangement accelerates the air across the inlet and decelerates the air at the diffuser, thereby creating a pressure differential on the duct across the fan disk, resulting in additional thrust. The theoretical thrust increase that may be realized by a ducted fan is limited in reality because the mixing of the flow of air through the fan with the flow of air that passes through the gap between the blade tips and the duct causes unfavorable flow characteristics that diminish the pressure differential, and therefore, the system generates less thrust than theoretically possible. Accordingly, in order to maximize additional thrust, minimizing the tip gap is a priority in ducted fan design. However, forces perpendicular to the rotation axis of the mast cause movement of the fan relative to the duct. If the fan moves enough that a fan blade contacts the duct, the result would be catastrophic. Accordingly, contrary to a standard helicopter rotor wherein some flexion is generally desirable, a ducted rotor may preferably be more rigid.

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a rotor assembly configured for increased out-of-plane stiffness, allowing for improved performance of a ducted fan arrangement. Currently, propellers/rotors have an out-of-plane stiffness determined by the stiffness of the mast between the hub and the closest mast bearing. The rotor assembly disclosed herein increases the out-of-plane stiffness by providing a clamping force through one or more components disposed between the hub and the mast bearing, thereby supplementing the stiffness of the mast over that distance. While the rotor assembly disclosed herein is described for use with a duct, it should be understood that it may be used in any application that may benefit from improved out of plane stiffness.

Figure 1:
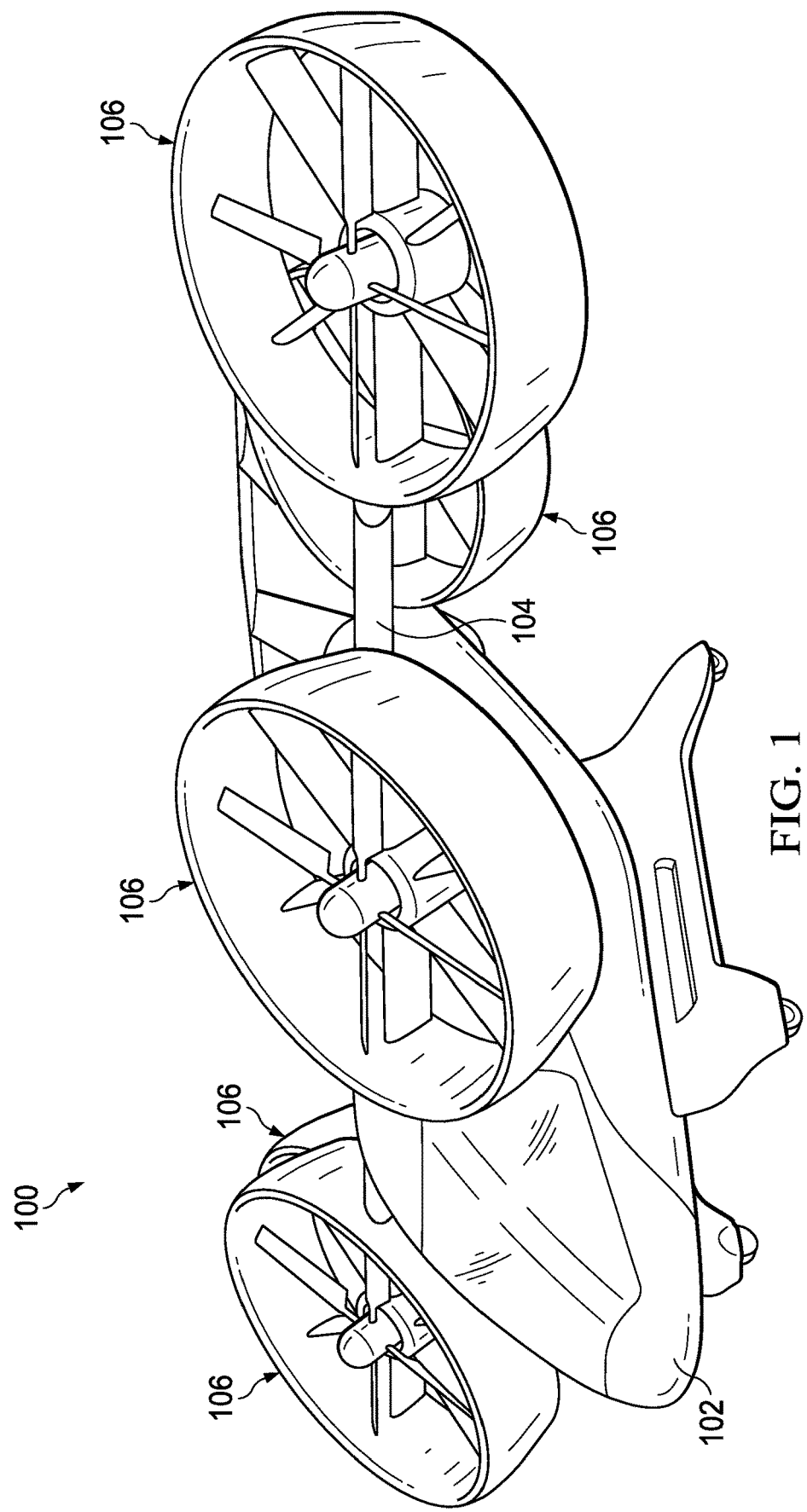
FIG. 1 is an oblique view of an aircraft including a rotor assembly, according to this disclosure.
Figure 2:
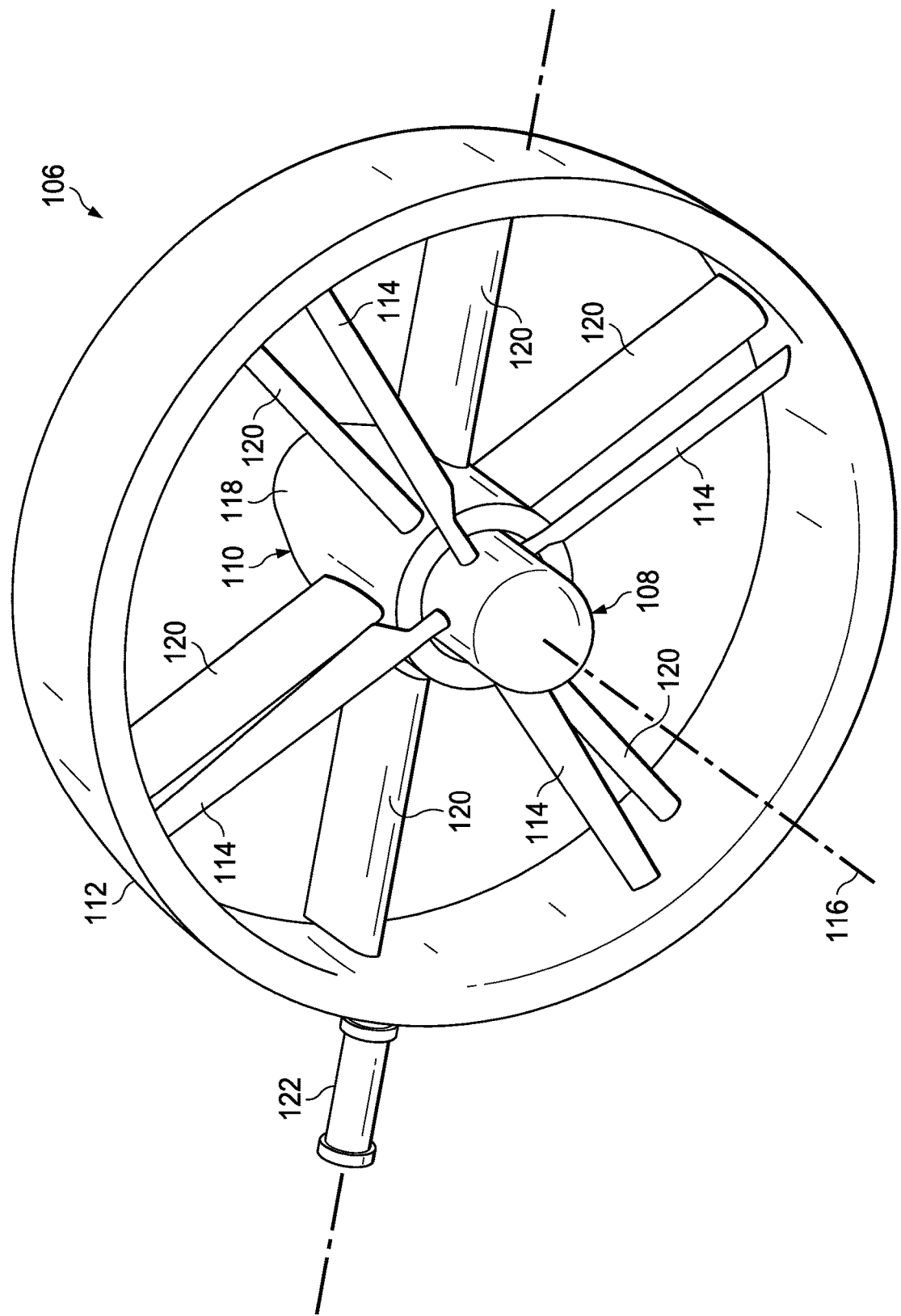
FIG. 2 is an oblique view of one of the ducted fans of the aircraft of FIG. 1.

FIG. 1 shows an aircraft 100 that is convertible between a helicopter mode, which allows for vertical takeoff and landing, hovering, and low speed directional movement, and an airplane mode, which allows for forward flight as well as horizontal takeoff and landing. Aircraft 100 includes a fuselage 102, a wing 104, and a plurality of ducted fans 106 rotatably coupled to fuselage 102 or wing 104. As best shown in FIG. 2, each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates lift while operating in helicopter mode and thrust while operating in airplane mode. Stator assembly 110 is positioned downstream of rotor blades 114 and includes a stator hub 118 centrally located within duct 112 and a plurality of stator vanes 120 coupled between duct 112 and stator hub 118. Stator hub 118 may house an electric motor therein configured to produce rotational energy that drives the rotation of rotor assembly 108. Alternatively, stator hub 118 may house a gearbox therein that drives the rotation of rotor assembly 108. Wherein the gearbox receives rotational energy from a driveshaft passing through an attachment post 122 and the adjacent stator vane 120.

Figure 3:
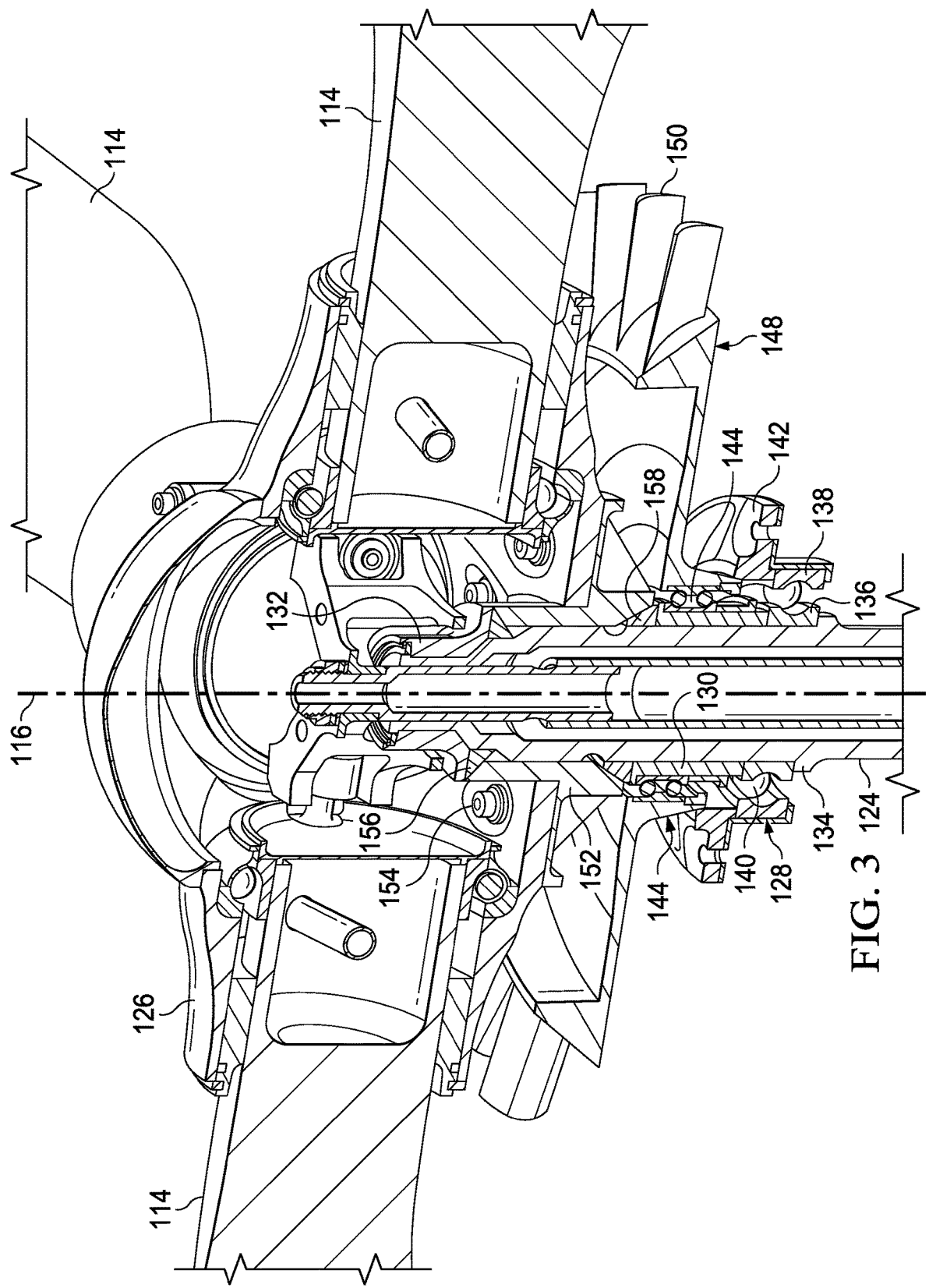
FIG. 3 is an oblique cross-sectional view of a rotor assembly, according to this disclosure.
Figure 4:
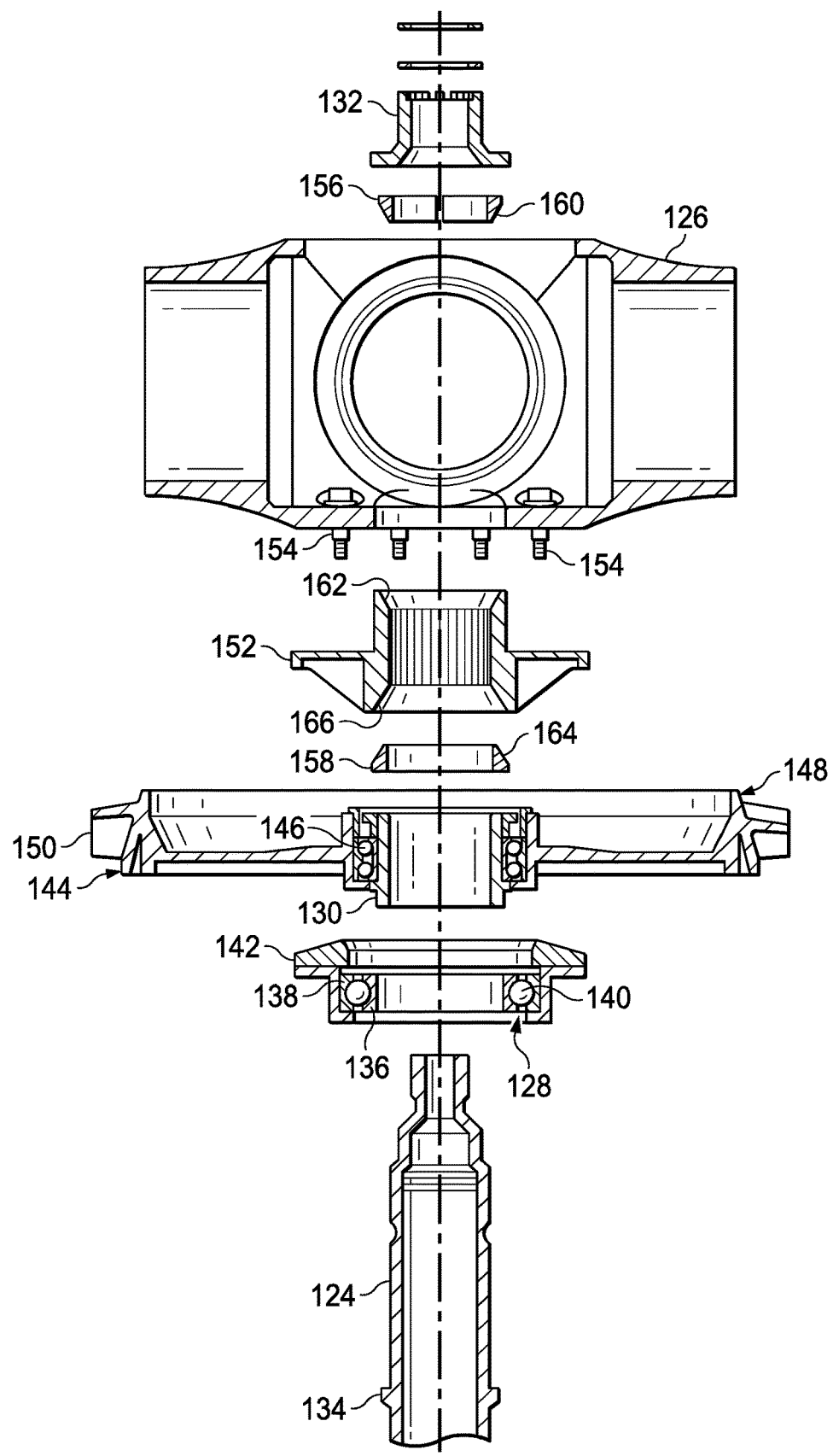
FIG. 4 is an exploded cross-sectional side view of the rotor assembly of FIG. 3.

FIGS. 3 and 4 show the components of rotor assembly 108. Rotor assembly 108 includes a rotor mast 124 configured to be driven in rotation about mast axis 116 by the motor or gearbox, a rotor hub 126 coupled to rotor mast 124 for common rotation therewith, plurality of rotor blades 114 coupled to rotor hub 126, a mast bearing 128 encircling rotor mast 124, a cuff 130 encircling rotor mast 124, and a mast nut 132 disposed within rotor hub 126 coupled to rotor mast 124. Rotor assembly 108 effectively increases the stiffness of rotor mast 124 by applying a compressive force from mast nut 132 through the components stacked along a length of rotor mast 124 between mast nut 132 and a shoulder 134 of rotor mast 124. Because the stacked components are rigidly coupled to rotor mast 124, the bending forces transmitted to rotor mast 124 from rotor blades 114 are reacted by both rotor mast 124 and the stacked components.

Mast bearing 128 includes an inner race 136, an outer race 138, and a plurality of roller elements 140 therebetween. Inner race 136 is coupled to rotor mast 124 for common rotation therewith, and a bottom surface of inner race 136 bears against shoulder 134 of rotor mast 124. Outer race 138 is coupled to bracket 142, which is in turn coupled to stator hub 118, thereby providing lateral stiffness to rotor mast 124 at the location of mast bearing 128.

Cuff 130 is stacked on top of, and bears against, a top surface of inner race 136. In the embodiment shown, cuff 130 is the innermost portion of an accessory adapter 144. Accessory adapter 144 includes an accessory bearing 146 coupled between cuff 130 and a fan disk 148. Fan disk 148 includes a plurality of fan blades 150 configured to generate airflow for cooling purposes towards the motor or gearbox inside stator hub 118. Accessory adapter 144 may be configured for the attachment of any accessory that may be desired in that location, for example, vibration, airflow, or temperature sensors. Furthermore, cuff 130 may comprise a spacer that is not configured for the attachment of any accessory, but instead serves the sole function of increasing the stiffness of rotor mast 124 along the length of cuff 130.

Rotor hub 126 is coupled to rotor mast 124 via a mast adapter 152. Rotor hub 126 is coupled to mast adapter 152 with bolts 154. In order to ensure mast adapter 152, and therefore, rotor hub 126 is centered on rotor mast 124, a first conical ring 156 is positioned between mast nut 132 and mast adapter 152 and a second conical ring 158 is positioned between cuff 130 and mast adapter 152. First conical ring 156 has a sloped outer surface 160 corresponding to a first sloped inner surface 162 proximate the top end of mast adapter 152 and second conical ring 158 has a sloped outer surface 164 that corresponds to a second sloped inner surface 166 proximate the bottom end of mast adapter 152. As mast nut 132 advances towards shoulder 134 of rotor mast 124, a compressive force is transferred through a plurality of stacked components including first conical ring 156, mast adapter 152, second conical ring 158, cuff 130, and inner race 136. As this compressive force is applied parallel to mast axis 116, the interactions between sloped outer surface 160 of first conical ring 156 and first sloped inner surface 162 of mast adapter 152 and between sloped outer surface 164 of second conical ring 158 and second sloped inner surface of mast adapter 152 causes a radial force that centers mast adapter 152 on rotor mast 124. While mast adapter 152 is shown as a separate component from rotor hub 126, it should be understood that they may comprise a unitary structure. Moreover, first conical ring 156 may be incorporated into mast nut 132 and or second conical ring 158 may be incorporated into cuff 130. The above-described compression forces transmitted through the plurality of stacked components can be described as comprising at least one uninterrupted load path extending from the mast nut 132 to the inner race 136.

Figure 5:
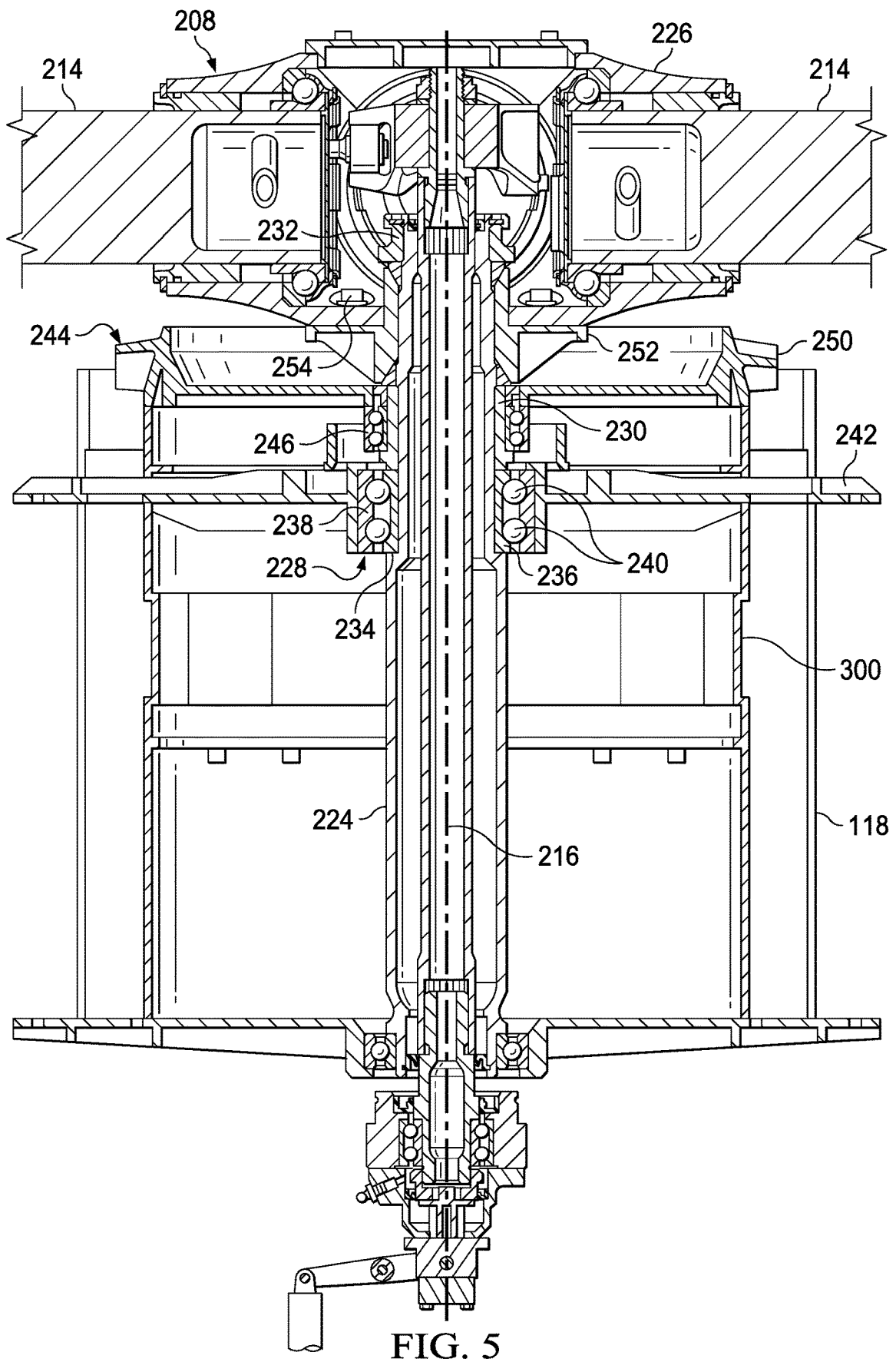
FIG. 5 is a cross-sectional side view of the rotor assembly of FIG. 3.
Figure 6:
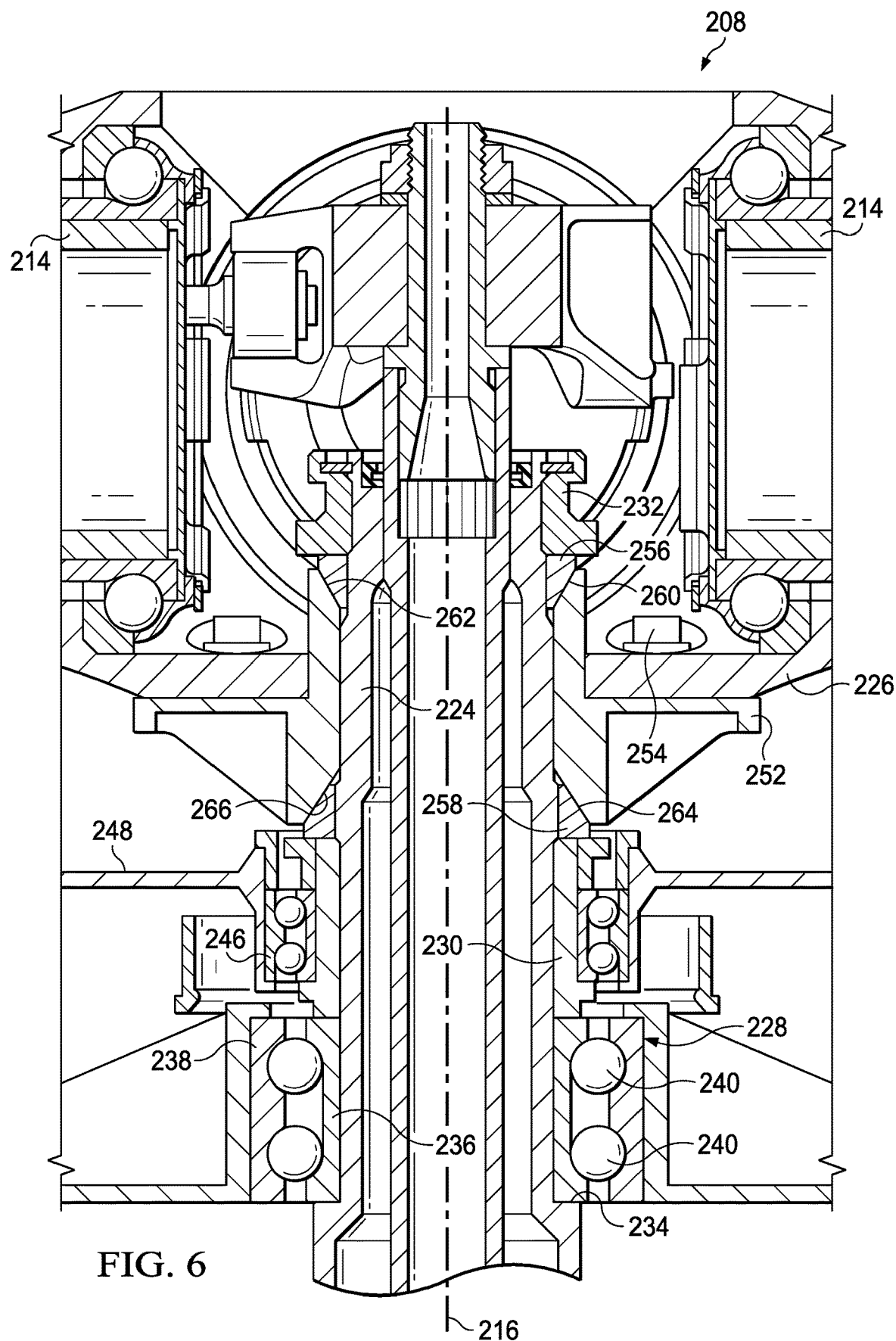
FIG. 6 is a cross-sectional side view of another rotor assembly, according to this disclosure.

FIGS. 5 and 6 show the components of another rotor assembly 208 configured for use with aircraft 100. Rotor assembly 208 includes a rotor mast 224 configured to be driven in rotation about mast axis 216 by a motor 300, a rotor hub 226 coupled to rotor mast 224 for common rotation therewith, plurality of rotor blades 214 coupled to rotor hub 226, a mast bearing 228 encircling rotor mast 224, a cuff 230 encircling rotor mast 224, and a mast nut 232 disposed within rotor hub 226 coupled to rotor mast 224. Rotor assembly 208 effectively increases the stiffness of rotor mast 224 by applying a compressive force from mast nut 232 through the components stacked along a length of rotor mast 224 between mast nut 232 and a shoulder 234 of rotor mast 224. Because the stacked components are rigidly coupled to rotor mast 224, the bending forces transmitted to rotor mast 224 from rotor blades 214 are reacted by both rotor mast 224 and the stacked components. Whereas shoulder 134 of rotor mast 124 is formed on an annular rim extending from an outer surface of rotor mast 124 that has an equal diameter on either side of the annular rim, shoulder 234 of rotor mast 224 is formed by stepping down the outer diameter of rotor mast 224.

Mast bearing 228 includes an inner race 236, an outer race 238, and a plurality of roller elements 240 therebetween. Inner race 236 is coupled to rotor mast 224 for common rotation therewith, and a bottom surface of inner race 236 bears against shoulder 234 of rotor mast 224. Outer race 238 is coupled to bracket 242, which is in turn coupled to stator hub 118, thereby providing lateral stiffness to rotor mast 224 at the location of mast bearing 228. Inner race 236 of mast bearing 228 has a length that is approximately equivalent to the length of cuff 230, whereas inner race 136 of mast bearing 128 is less than half the length of cuff 130. These length ratios are simply exemplary, other relative lengths may be utilized depending on the specific requirements of the particular application.

Cuff 230 is stacked on top of, and bears against, a top surface of inner race 236. In the embodiment shown, cuff 230 is the innermost portion of an accessory adapter 244. Accessory adapter 244 includes an accessory bearing 246 coupled between cuff 230 and a fan disk 248. Fan disk 248 includes a plurality of fan blades 250 configured to generate airflow for cooling purposes towards motor 300 inside stator hub 118. Accessory adapter 244 may be configured for the attachment of any accessory that may be desired in that location, for example, vibration, airflow, or temperature sensors. Furthermore, cuff 230 may comprise a spacer that is not configured for the attachment of any accessory, but instead serves the sole function of increasing the stiffness of rotor mast 224 along the length of cuff 230.

Rotor hub 226 is coupled to rotor mast 224 via a mast adapter 252. Rotor hub 226 is coupled to mast adapter 252 with bolts 254. In order to ensure mast adapter 252, and therefore, rotor hub 226 is centered on rotor mast 224, a first conical ring 256 is positioned between mast nut 232 and mast adapter 252 and a second conical ring 258 is positioned between cuff 230 and mast adapter 252. First conical ring 256 has a sloped outer surface 260 corresponding to a first sloped inner surface 262 proximate the top end of mast adapter 252 and second conical ring 258 has a sloped outer surface 264 that corresponds to a second sloped inner surface 266 proximate the bottom end of mast adapter 252. As mast nut 232 advances towards shoulder 234 of rotor mast 224, a compressive force is transferred through a plurality of stacked components including first conical ring 256, mast adapter 252, second conical ring 258, cuff 230, and inner race 236. As this compressive force is applied parallel to mast axis 216, the interactions between sloped outer surface 260 of first conical ring 256 and first sloped inner surface 262 of mast adapter 252 and between sloped outer surface 264 of second conical ring 258 and second sloped inner surface of mast adapter 252 causes a radial force that centers mast adapter 252 on rotor mast 224. While mast adapter 252 is shown as a separate component from rotor hub 226, it should be understood that they may comprise a unitary structure. Moreover, first conical ring 256 may be incorporated into mast nut 232 and or second conical ring 258 may be incorporated into cuff 230.

The components of rotor assemblies 108 and 208 may comprise any materials suitable for use with an aircraft rotor.

For example, rotor blades 114 and 214 and rotor hubs 126 and 226 may comprise carbon fiber or aluminum; and rotor masts 124 and 224, rotor hubs 126 and 226, mast bearings 128 and 228, cuffs 130 and 230, mast nuts 132 and 232, mast adapters 152 and 252, first conical rings 156 and 256, and second conical rings 158 and 258 may comprise steel or titanium.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor assembly, comprising:
   a rotor mast configured to be driven in rotation about a mast axis;
   a rotor hub coupled to the rotor mast for common rotation therewith;
   a plurality of rotor blades extending from the rotor hub;
   a mast bearing including an inner race, an outer race, and a plurality of roller elements therebetween, the inner race being coupled to the rotor mast for common rotation therewith;
   a cuff surrounding the rotor mast, the cuff being positioned axially between the rotor hub and the mast bearing; and
   a mast nut configured to apply a compressive force to the cuff and the inner race of the mast bearing.

2. The rotor assembly of claim 1, wherein the rotor mast includes a shoulder adjacent the mast bearing.

3. The rotor assembly of claim 2, further comprising:
   a mast adapter, wherein the mast adapter couples the rotor hub to the rotor mast for common rotation therewith, the mast adapter being configured to be subject to the compressive force applied by the mast nut.

4. The rotor assembly of claim 3, further comprising:
   a first conical ring positioned between the mast nut and the mast adapter.

5. The rotor assembly of claim 4, further comprising:
   a second conical ring positioned between the mast adapter and the cuff.

6. The rotor assembly of claim 1, further comprising:
   an adapter bearing coupled to the cuff; and
   a fan disk coupled to the adapter bearing.

7. A rotor assembly, comprising:
   a rotor mast configured to be driven in rotation about a mast axis;
   a rotor hub coupled to the rotor mast for common rotation therewith;
   a plurality of rotor blades extending from the rotor hub;
   a mast bearing coupled to the rotor mast;
   a mast nut coupled to the rotor mast; and
   a component disposed axially between the mast nut and the mast bearing, the component being configured to resist flexion of the rotor mast.

8. The rotor assembly of claim 7, wherein the mast nut is configured to apply a compressive force through the component.

9. The rotor assembly of claim 7, wherein the mast nut is disposed within the rotor hub.

10. The rotor assembly of claim 7, wherein the component comprises an accessory adapter, comprising:
    a cuff coupled for common rotation with the rotor mast.

11. The rotor assembly of claim 10, wherein the accessory adapter further comprises:
    an accessory bearing coupled to the cuff; and
    a fan disk coupled to the accessory bearing.

12. The rotor assembly of claim 7, wherein the component comprises a plurality of components, including:
    a mast adapter, wherein the mast adapter couples the rotor hub to the rotor mast for common rotation therewith; and
    a cuff coupled for common rotation with the rotor mast.

13. The rotor assembly of claim 12, wherein the plurality of components further comprises:
    a first conical ring positioned between the mast nut and the mast adapter; and
    a second conical ring positioned between the cuff and the mast adapter.

14. The rotor assembly of claim 13, further comprising:
    an accessory bearing coupled to the cuff; and
    a fan disk coupled to the accessory bearing.

15. An aircraft, comprising:
    a fuselage;
    a motor configured to produce rotational energy; and
    a rotor assembly, comprising:
      a rotor mast configured to be driven in rotation about a mast axis by the rotational energy produced by the motor;
      a rotor hub coupled to the rotor mast for common rotation therewith;
      a plurality of rotor blades extending from the rotor hub;
      a mast bearing coupled to the rotor mast;
      a mast nut coupled to the rotor mast; and
      a component disposed axially between the rotor hub and the mast bearing, the component being configured to resist flexion of the rotor mast.

16. The aircraft of claim 15, further comprising:
a duct surrounding the plurality of rotor blades.

17. The aircraft of claim 16, wherein the duct and the rotor assembly are configured to rotate relative to the fuselage.

18. The aircraft of claim 15, wherein the component comprises an accessory adapter, comprising:
a cuff coupled for common rotation with the rotor mast.

19. The aircraft of claim 18, wherein the accessory adapter further comprises:
an accessory bearing coupled to the cuff; and
a fan disk coupled to the accessory bearing.

20. The aircraft of claim 18, wherein the component comprises a plurality of components including:
a mast adapter, wherein the mast adapter couples the rotor hub to the rotor mast for common rotation therewith;
a first conical ring positioned between the mast nut and the mast adapter; and
a second conical ring positioned between the cuff and the mast adapter.

* * * * *